United States Patent
Janssen

(10) Patent No.: US 10,102,875 B1
(45) Date of Patent: Oct. 16, 2018

(54) SERVO PATTERN FOR PRECISE TRACKING IN OPTICAL TAPES

(71) Applicant: Oracle International Corporation, Redwood Shores, CA (US)

(72) Inventor: Clark Janssen, Loveland, CO (US)

(73) Assignee: Oracle International Corporation, Redwood Shores, CA (US)

(*) Notice: Subject to any disclaimer, the term of this patent is extended or adjusted under 35 U.S.C. 154(b) by 0 days.

(21) Appl. No.: 15/665,337

(22) Filed: Jul. 31, 2017

(51) Int. Cl.
- *G11B 5/008* (2006.01)
- *G11B 7/09* (2006.01)
- *G11B 7/24009* (2013.01)
- *G11B 7/24073* (2013.01)
- *G11B 7/0045* (2006.01)
- *G11B 7/005* (2006.01)
- *G11B 7/24* (2013.01)

(52) U.S. Cl.
CPC .............. *G11B 7/094* (2013.01); *G11B 7/005* (2013.01); *G11B 7/0045* (2013.01); *G11B 7/24009* (2013.01); *G11B 7/24073* (2013.01); *G11B 2007/240017* (2013.01)

(58) Field of Classification Search
None
See application file for complete search history.

(56) References Cited

U.S. PATENT DOCUMENTS

| | | | | |
|---|---|---|---|---|
| 4,764,826 A * | 8/1988 | Estes | ................... | G11B 15/1808 360/132 |
| 5,215,808 A * | 6/1993 | Barnard | ................. | G11B 7/003 346/135.1 |
| 5,377,059 A * | 12/1994 | Lee | ......................... | G11B 5/008 360/271.6 |
| 5,434,677 A * | 7/1995 | Oikawa | .............. | G11B 5/00878 375/E7.189 |
| 5,674,583 A * | 10/1997 | Nakayama | ............... | G11B 5/00 369/106 |
| 5,742,456 A * | 4/1998 | Kinjo | .................... | G11B 15/602 360/130.24 |
| 5,864,648 A * | 1/1999 | Sasaki | ................... | G11B 15/026 360/77.01 |
| 6,236,800 B1 * | 5/2001 | Nishima | .............. | G11B 5/0086 386/289 |
| 6,452,760 B1 * | 9/2002 | Inaguma | .............. | G11B 5/3903 360/271 |
| 7,342,738 B1 * | 3/2008 | Anderson | ............. | G11B 5/584 360/77.12 |

(Continued)

Primary Examiner — Peter Vincent Agustin
(74) Attorney, Agent, or Firm — Invoke

(57) ABSTRACT

Techniques for performing precise tracking in optical tapes are provided. The techniques include providing and using a servo pattern on an optical tape. The servo pattern includes a first set of parallel physical grooves slanted in a first direction across a width of the optical tape and a second set of parallel physical grooves slanted in a second direction that is different from the first direction across the width of the optical tape. Subsets of the first set of parallel physical grooves alternate with subsets of the second set of parallel physical grooves along a length of the optical tape. Two subsets of the first set of parallel physical grooves separated by one subset of the second set of parallel physical grooves form a servo frame in the optical tape.

18 Claims, 5 Drawing Sheets

(56) References Cited

U.S. PATENT DOCUMENTS

| | | | |
|---|---|---|---|
| 2004/0228020 A1* | 11/2004 | Molstad | G11B 5/00813 360/48 |
| 2005/0117493 A1* | 6/2005 | Sueki | G11B 7/003 369/96 |
| 2008/0049356 A1* | 2/2008 | Weber | G11B 5/584 360/77.12 |
| 2008/0198500 A1* | 8/2008 | Weber | G11B 5/584 360/77.02 |
| 2010/0079890 A1* | 4/2010 | Brummet | G11B 5/584 360/40 |
| 2013/0063836 A1* | 3/2013 | Bui | G11B 5/00826 360/66 |
| 2014/0002916 A1* | 1/2014 | Harper | G11B 5/00826 360/31 |
| 2014/0139944 A1* | 5/2014 | Johnson | G11B 5/008 360/75 |

* cited by examiner

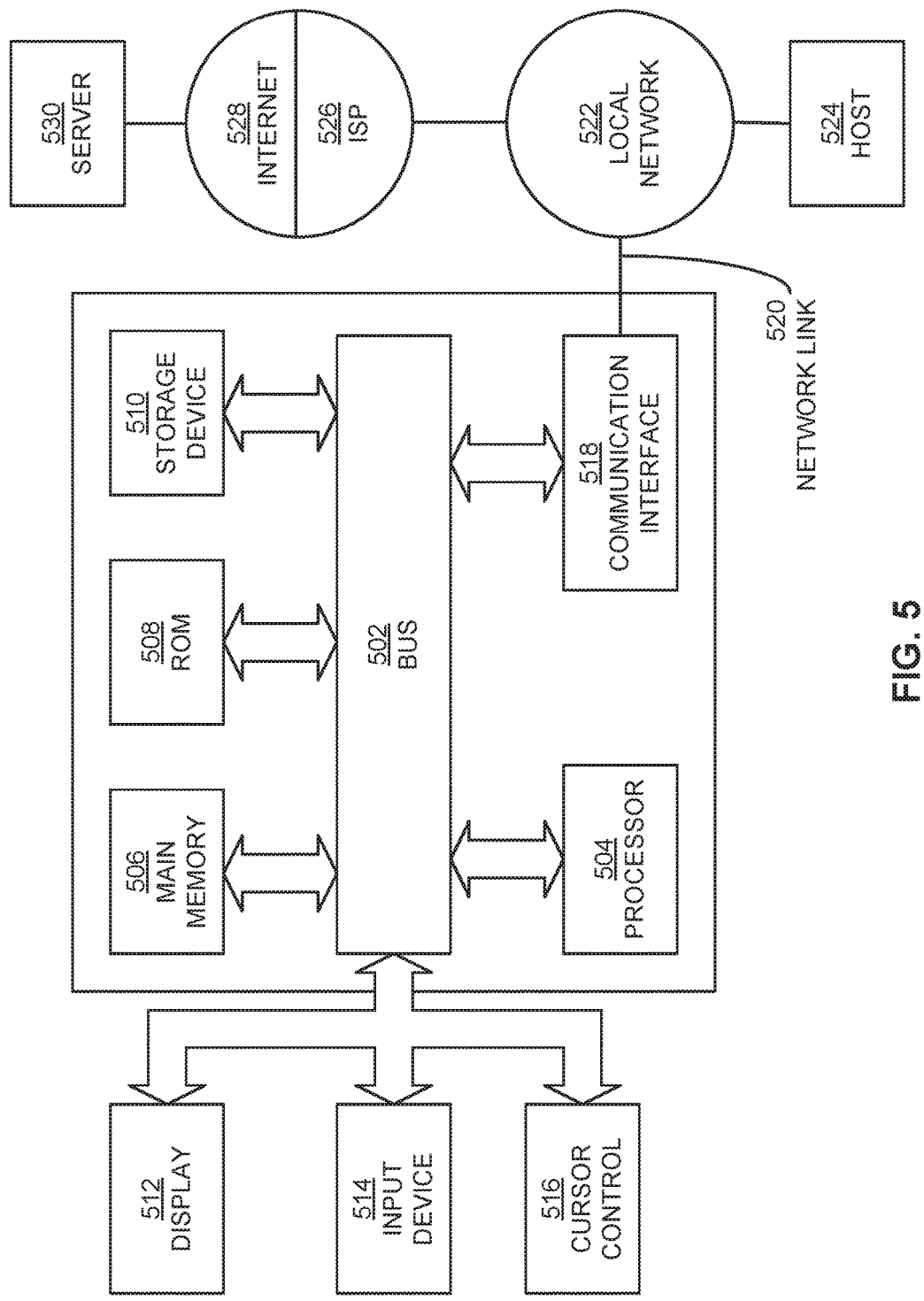

SERVO PATTERN FOR PRECISE TRACKING IN OPTICAL TAPES

TECHNICAL FIELD

The present disclosure relates to optical tape storage. In particular, the present disclosure relates to a servo pattern for precise tracking in optical tapes.

BACKGROUND

In optical tape storage technology, precise tracking performance is typically required to position a laser in a tape drive relative to an optical tape so that the laser can read data from or write data to a proper track position on the tape. To assist in positioning of the laser, a servo pattern that encodes position information may be written onto the optical tape during manufacturing of the optical tape. The tape head may read the servo pattern, and a controller for the tape head may use a position signal decoded from the servo pattern to adjust the position of the tape head to move between tracks and/or follow a given track.

Servo patterns borrowed from conventional optical disk storage use an alternating land-and-groove pattern to demarcate individual data tracks in the tapes. Each data track may be written to a given land and uniquely identified by a periodic wobble in the corresponding land. To move from one data track to another, the tape drive may move the laser by an estimate of the distance separating the data tracks. The laser may then decode the wobble at the laser's new position to determine if the track currently read by the laser is the correct one. If the track is not the correct, target data track, the process may repeat until the right track is found. Consequently, servo tracking systems for optical tape drives may use potentially frequent, repetitive, and costly error recovery techniques to locate and identify the correct track during reading and/or writing of optical tapes.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 5 shows a block diagram that illustrates a computer system in accordance with one or more embodiments.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. SERVO PATTERN FOR PRECISE TRACKING IN OPTICAL TAPES
4. EXAMPLE EMBODIMENT
5. PRECISE TRACKING ON AN OPTICAL TAPE
6. IDENTIFYING A DATA TRACK AT A LATERAL POSITION ON AN OPTICAL TAPE
7. COMPUTER NETWORKS AND CLOUD NETWORKS
8. MISCELLANEOUS; EXTENSIONS
9. HARDWARE OVERVIEW

1. General Overview

Techniques for performing precise tracking in optical tapes are provided. The techniques include providing and using a servo pattern on an optical tape. The servo pattern includes a first set of parallel physical grooves slanted in a first direction across a width of the optical tape and a second set of parallel physical grooves slanted in a second direction that is different from the first direction across the width of the optical tape. Subsets of the first set of parallel physical grooves alternate with subsets of the second set of parallel physical grooves along a length of the optical tape. Two subsets of the first set of parallel physical grooves separated by one subset of the second set of parallel physical grooves form a servo frame in the optical tape.

One or more embodiments described in this Specification and/or recited in the claims may not be included in this General Overview section.

2. Architectural Overview

Figure 1:
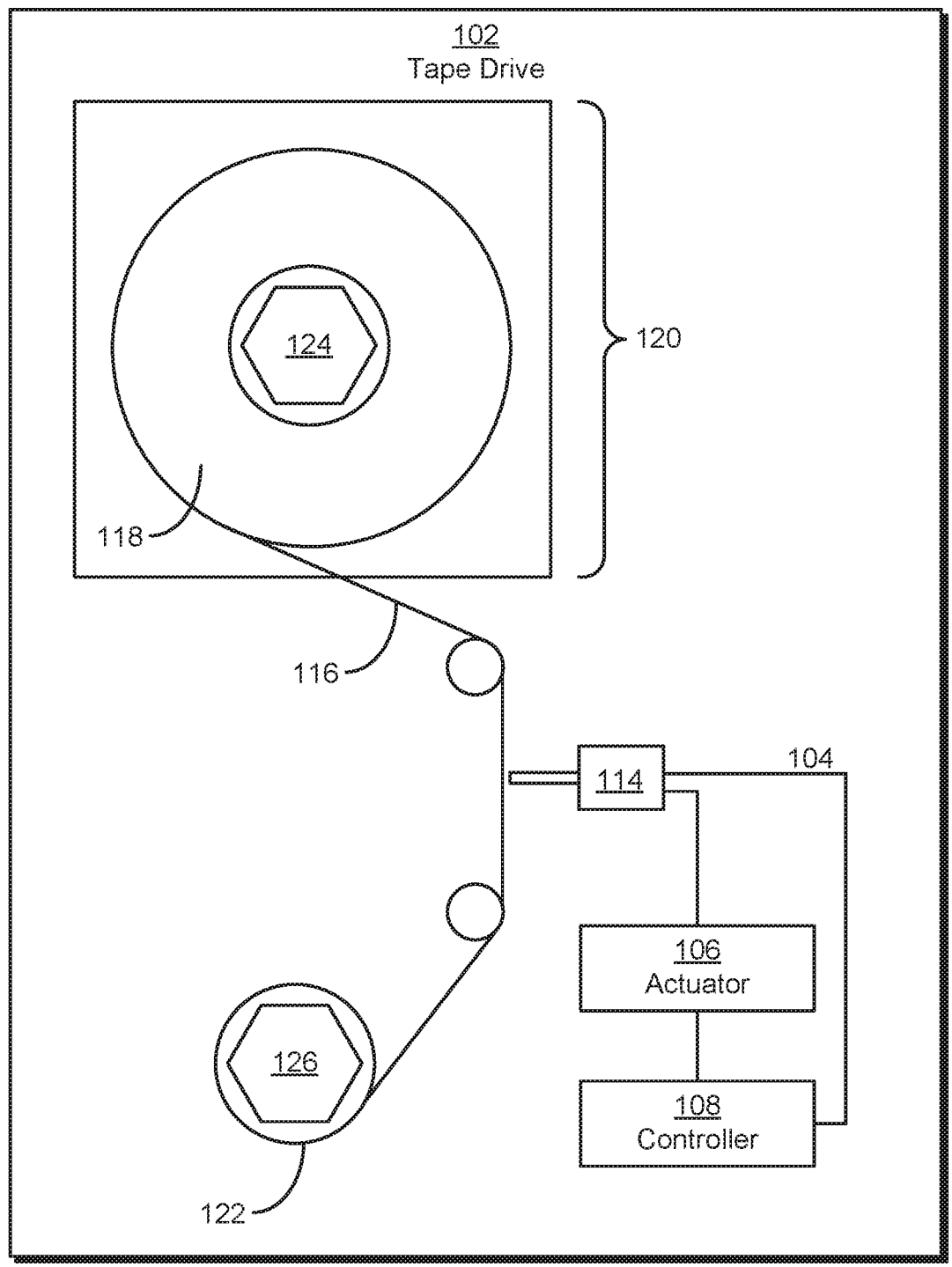
FIG. 1 illustrates a system in accordance with one or more embodiments.

FIG. 1 illustrates a system in accordance with one or more embodiments. As illustrated in FIG. 1, the system may include a tape drive 102 that reads and writes data on an optical tape 116. Optical tape 116 may be used to store digital data on a series of parallel data tracks that span the length of optical tape. For example, optical tape 116 may be used to archive and/or retain data in a data center and/or for an organization.

During reading or writing of optical tape 116, tape drive 102 may unwind optical tape 116 from one reel 118 in a cartridge 120 onto another reel 122 by a number of reel drive motors 124-126. As optical tape 116 is unwound, an optical pick-up unit (OPU) 114 may generate a position signal 104 from a servo pattern written onto optical tape 116. For example, OPU 114 may include a read and write laser that reads and writes to data tracks on optical tape 116 and/or a photo detector that generates position signal 104 by reading a servo pattern on optical tape 116.

A conventional servo pattern on optical tape 116 may include a series of parallel lands and grooves running along the length of optical tape 116. Each land may represent a data track, and each pair of adjacent data tracks may be separated by a groove. OPU 114 and/or another component of tape drive 102 may read a periodic wobble in the land to identify the track number of the corresponding data track (e.g., by decoding the track number from the wobble). Thus, the component may identify the lateral position of OPU 114 only after reading and decoding a portion of the wobble in the data track over which OPU 114 is currently positioned.

The laser, photo detector, and/or other components of OPU 114 may be coupled to an actuator 106 that adjusts the lateral position of OPU 114 and a controller 108 that generates a signal for controlling actuator 106. For example, controller 108 may be a closed-loop controller that compares position signal 104 generated by OPU 114 with a target position signal for a target data track on optical tape 116. To move OPU 114 to the target data track, controller 108 may generate a control signal to one or more components of actuator 106 based on the comparison, and actuator 106 may reposition OPU 114 according to the control signal. A new position signal 104 is then generated from the new position of OPU 114 and fed back into controller 108 for continual updating of position signal 104 based on the target. For example, position signal 104 may be compared with the target position signal, and the control signal from controller 108 and output of actuator 106 may be used to minimize a tracking error representing the difference between position signal 104 and the target position signal.

In one or more embodiments, the system may include more or fewer components than the components illustrated in FIG. 1. For example, controller 108 may include, execute with, or exclude OPU 114, actuator 106, and/or other components for generating position signal 104 from optical tape 116. Such components may be local to or remote from each other, implemented in software and/or hardware, and/or distributed over multiple applications and/or machines. Multiple components may also be combined into one application and/or machine. Operations described with respect to one component may instead be performed by another component.

Additional embodiments and/or examples relating to computer networks are described below in Section 6, titled "Computer Networks and Cloud Networks."

In one or more embodiments, a data repository is any type of physical or virtual storage unit and/or device (e.g., a filesystem, database, collection of tables, or any other storage mechanism) for storing data. Further, the data repository may include multiple different storage units and/or devices. The multiple different storage units and/or devices may or may not be of the same type or located at the same physical site. The data repository may be implemented or may execute on the same computing system as tape drive 102 or on a computing system that is separate from tape drive 102. For example, the data repository may store measurements and/or calculated values associated with position signal 104 and/or target position signals or target data tracks. The data repository may be communicatively coupled to tape drive 102 via a direct connection or via a network.

In one or more embodiments, tape drive 102 refers to hardware and/or software configured to perform saturation-based verification of optical tape storage. Examples of such operations are described below.

In an embodiment, tape drive 102 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

3. Servo Pattern for Precise Tracking in Optical Tapes

Figure 2:
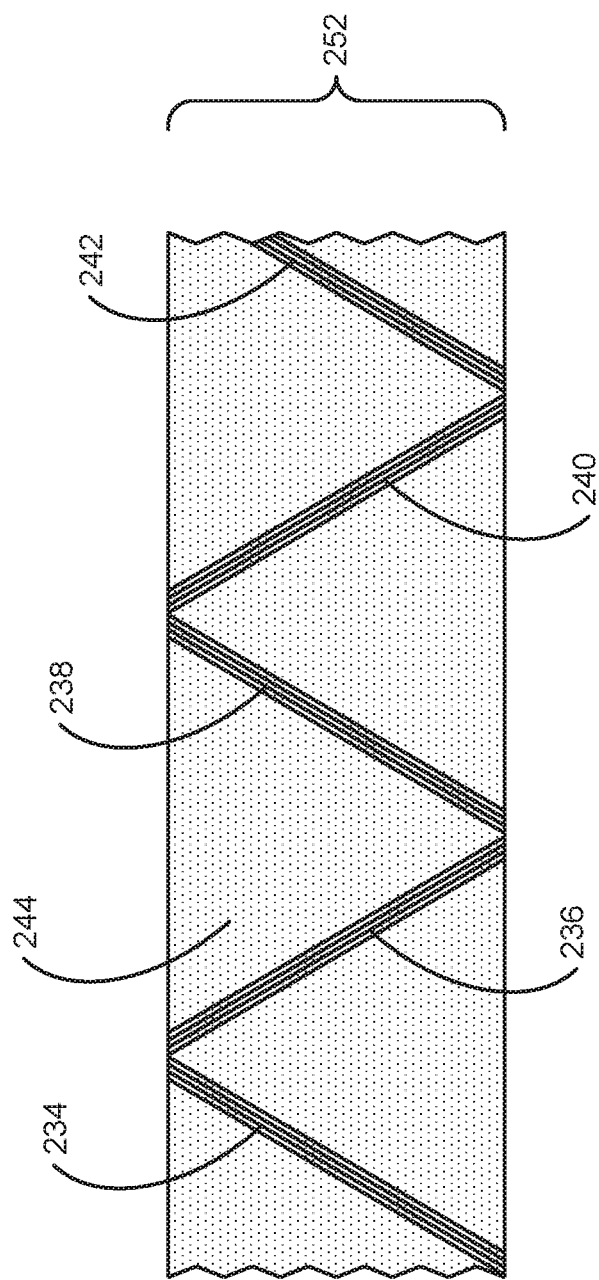
FIG. 2 shows an exemplary servo pattern on an optical tape in accordance with one or more embodiments.

In one or more embodiments, tape drive 102 includes functionality to perform precise tracking using a servo pattern that provides continuous feedback related to the lateral position of OPU 114 during reading and/or writing of optical tape 116. As shown in FIG. 2, the servo pattern may include repeating sets of parallel grooves 234-242 that alternate back and forth across a band 252 that spans some or all of the width of an optical tape (e.g., optical tape 116 of FIG. 1) and along a length of the optical tape. For example, grooves 234-242 and/or other sets of parallel grooves (not shown) may form a "zig-zag" pattern along the length of the optical tape. The zig-zag pattern may be duplicated across a series of contiguous bands that span a width of the optical tape (e.g., four zig-zag patterns across the width of the optical tape, with each pattern occupying a band that spans ¼ of the width and that is scanned by one of four different OPUs in a tape drive). In the pattern, three sets of grooves 234, 238 and 242 are parallel to one another and placed at fixed intervals along the optical tape, and two sets of grooves 236 and 240 are parallel to one another and placed at a fixed interval along the optical tape. Thus, grooves 234, 238 and 242 may slant in one direction (e.g. upward) across band 252 of the optical tape, and grooves 236 and 240 may slant in another direction (e.g., downward) across band 252. The angles formed by the slants in grooves 234-242 may range between 0 and 90 degrees and exclude 0 and 90 degrees. For example, grooves 234-242 may be slanted 15-20 degrees from the edges of the optical tape.

Each set of grooves 234-242 may begin immediately after the preceding set of grooves end (e.g., at the top or bottom of a corresponding portion of band 252 spanned by grooves 234-242). Alternatively, each set of grooves 234-242 may be separated from either or both adjacent sets of grooves by a predetermined distance.

Grooves 234-242 may be formed on a substrate that is layered over and/or under a rewritable recording layer 244 in the optical tape. For example, recording layer 244 may include a phase-change material that converts between a reflective crystalline state and a dark amorphous state based on exposure to a laser beam generated by an OPU (e.g., OPU 114 of FIG. 1) in a tape drive (e.g., tape drive 102 of FIG. 1). The OPU may thus write to the optical tape by using the laser beam to heat selected areas of recording layer 224 and read from the optical tape by scanning previously recorded dark spots and reflective areas on recording layer 224.

Grooves 234-242 and/or the servo pattern formed by grooves 234-242 may be produced in a number of ways. First, each set of grooves 234-242 may include a number of equally spaced grooves that are imprinted and/or otherwise formed in the substrate, with adjacent grooves separated by a relatively higher "land" of a predetermined width. For example, each groove may be one micron wide, and adjacent grooves in a given set of parallel grooves may be separated by a distance of one micron. As a result, the separation between grooves in each set of parallel grooves may be approximately equal to the width of the grooves to facilitate detection and/or resolution of the set by the OPU (e.g., as the set passes underneath the OPU).

Second, portions of the optical tape that are covered by grooves 234-242 may have a different reflectivity than other areas of the optical tape. For example, the optical tape may have a reflective layer (not shown) that facilitates reading and/or writing of data on the optical tape by the OPU. To facilitate detection of grooves 234-242 by the OPU, the reflective layer may be masked off and/or removed in areas of the optical tape that overlap with grooves 234-242.

Grooves 234-242 may run along directions that are not parallel to data tracks on the optical tape. For example, recording layer 224 may have a series of parallel data tracks that extend along the length of the optical tape and intersect grooves 234-242 at two different (e.g., opposite) angles. Because the data tracks may be separated by very small distances (e.g., nanometers), fine tracking control of the OPU may be required to accurately read and write to the optical tape.

In one or more embodiments, the servo pattern formed by grooves 234-242 is sensed by the OPU and used by a controller (e.g., controller 108 of FIG. 1) to continuously assess the lateral position of the OPU and perform precise tracking during reading and writing of the optical tape. In particular, three consecutive sets of grooves in the servo pattern (e.g., grooves 234-238, groove 236-240, grooves 238-242, etc.) may form a servo frame in the optical tape. Within the servo frame, the fixed separation between the outer two sets of grooves may be used to determine the speed of the optical tape as the optical tape is unwound in the tape drive. The speed of the optical tape may then be used to determine, for a given lateral position along band 252, the distance between an outer set of grooves in the servo frame and the middle set of grooves in the servo frame. For example, the distance may be determined by dividing the time interval spanned between detecting the one outer set of grooves and the middle set of grooves by a longer time interval spanned between detecting the first outer set of grooves and the second outer set of grooves. In turn, the distance may be updated every time a new servo frame is read by the OPU (e.g., every 100-200 microns along the length of the optical tape).

As the optical tape moves underneath the OPU, the controller may use the distance between two adjacent sets of grooves in the servo pattern to determine the lateral position of the OPU along band 252. The controller may then use the distance to maintain the lateral position of the OPU during reading and writing of the data track and/or move the OPU to a target data track.

For example, the controller may execute in a closed loop environment, in which the controller compares the current lateral position of the OPU as calculated from the relative distance between two adjacent sets of grooves in the servo pattern with a target lateral position for a target data track. The target data track may be the current data track over which the OPU is positioned or a different data track on the optical tape. Based on the difference between the lateral position and the target lateral position, the controller may generate a control signal to the actuator for the OPU, and the actuator may reposition the tape head according to the control signal. A new distance between adjacent sets of grooves is then generated from the OPU's new position and fed back into the controller to minimize the tracking error between the lateral position and the target lateral position. To move the OPU between two different data tracks, the controller may generate a control signal that initially moves the OPU by a relatively large amount and subsequently by smaller amounts as the OPU approaches and locks onto the target data track.

Because the servo pattern of FIG. 2 is not used to demarcate individual data tracks on the optical tape, tracking using the servo pattern may be adapted to different numbers of data tracks and/or areal densities on the optical tape. As a result, the same optical tape and/or servo pattern may be used with tape drives that read and write at different areal densities instead of requiring different sets of conventional "land and groove" servo patterns to be imprinted on optical tapes to accommodate different areal densities supported by the tape drives.

4. Example Embodiment

A detailed example is described below for purposes of clarity. Components and/or operations described below should be understood as one specific example, which may not be applicable to certain embodiments. Accordingly, components and/or operations described below should not be construed as limiting the scope of any of the claims.

Continuing with the servo pattern of FIG. 2, the controller may use servo frames containing two outer sets of grooves that slant upward (e.g., grooves 234, 238, and 242) and a middle set of grooves that slants downward (e.g., grooves 236 and 240) to determine the lateral position of the OPU. The controller may alternatively or additionally use servo frames containing two outer sets of grooves that slant downward and a middle set of grooves that slants upward to determine the lateral position of the OPU.

The controller may detect the outer two sets of grooves as odd- or even-numbered readings of the servo pattern from the OPU. If the optical tape is unwound as a fixed speed, the odd- or even-numbered readings may be spaced by substantially equal time intervals. Time intervals separating consecutive readings of the servo pattern may then be used to determine the lateral position of OPU on the optical tape.

For example, the controller may obtain readings of a servo frame containing grooves 234-238. The controller may detect a lateral position near the top of the optical tape as a relatively short time interval separating readings of the first two sets of grooves 234-236 in the servo frame and/or a relatively longer time interval separating readings of the second and third sets of grooves 236-238 in the servo frame. Conversely, the controller may detect a lateral position near the bottom of the optical tape as a relatively long time interval separating readings of the first two sets of grooves 234-236 in the servo frame and/or a relatively shorter time interval separating readings of the second and third sets of grooves 236-238 in the servo frame.

In another example, the controller may obtain readings from a servo frame containing grooves 236-240. The controller may detect a lateral position near the top of the optical tape as a relatively long time interval separating readings of the first two sets of grooves 236-238 and/or a relatively shorter time interval separating readings of the second and third sets of grooves 238-240 in the servo frame. On the other hand, the controller may detect a lateral position near the bottom of the optical tape as a relatively short time interval separating readings of the first two sets of grooves 236-238 in the servo frame and/or a relatively longer time interval separating readings of the second and third sets of grooves 238-240 in the servo frame.

In both examples, if grooves in the servo pattern slant upward and downward at the same angle relative to the edges of the optical tape, a lateral position near the middle of the optical tape may be detected as time intervals of approximately equal length separating the first two sets of grooves and the second and third sets of grooves in the servo frame. Moreover, the lateral position of the OPU may be determined from the proportion containing a first time interval between readings of two consecutive sets of grooves in a servo frame and a second time interval between readings of the first and third sets of grooves in the servo frame. For example, a first time interval that is 30% as long as the second time interval may indicate that the OPU is positioned ³/₁₀ths of the way between the two edges of the optical tape.

As a result, the number of data tracks that can be resolved by the controller may be affected by the precision with which the proportion is calculated. Continuing with the previous example, the first time interval may be divided by the second time interval to determine the relative lateral position of the OPU along band 252. Thus, the number of individual data tracks that can be identified by the controller may be determined based on the number of significant digits in the result of the division. If dividing the first time interval by the second time interval produces two significant digits, the controller may resolve up to 100 data tracks in the optical tape. If dividing the first time interval by the second time interval produces four significant digits, the controller may resolve up to 10,000 data tracks in the optical tape.

In turn, the controller may use the servo frame readings and corresponding lateral positions of the OPU to generate a control signal for performing tracking in the optical tape. For example, the controller may match the lateral position calculated from the most recent servo frame to a data track on the optical tape. The controller may also generate a control signal to shift the OPU upwards or downwards along band 252. If an upward shift causes the time interval separating the readings of the first two sets of grooves in subsequent servo frames to decrease and a downward shift causes the time interval to increase, the controller may be calculating the lateral position from servo frames containing two outer sets of grooves that slant upward and a middle set of grooves that slants downwards. If the upward shift causes the time interval to increase and a downward shift causes the time interval to decrease, the controller may be calculating the lateral position of the OPU from servo frames containing two outer sets of grooves that slant downward and a middle set of grooves that slants upward. After the controller determines the configuration of the three sets of grooves in a given servo frame, the controller may use readings from subsequent servo frames in the same configuration to read and write to individual data tracks and/or move between data tracks in the optical tape.

Those skilled in the art will appreciate that the servo pattern of FIG. 2 may be used to determine the lateral position of the OPU and the corresponding data track in the optical tape in other ways. For example, the controller may determine the lateral position of the OPU by comparing the relative distance between the first and second sets of grooves in a given servo frame with the relative distance between the second and third sets of grooves in the servo frame, instead of or in addition to comparing the relative distance between the middle set of grooves and one outer set of grooves with the relative distance between the two outer sets of grooves.

5. Precise Tracking in an Optical Tape

Figure 3:
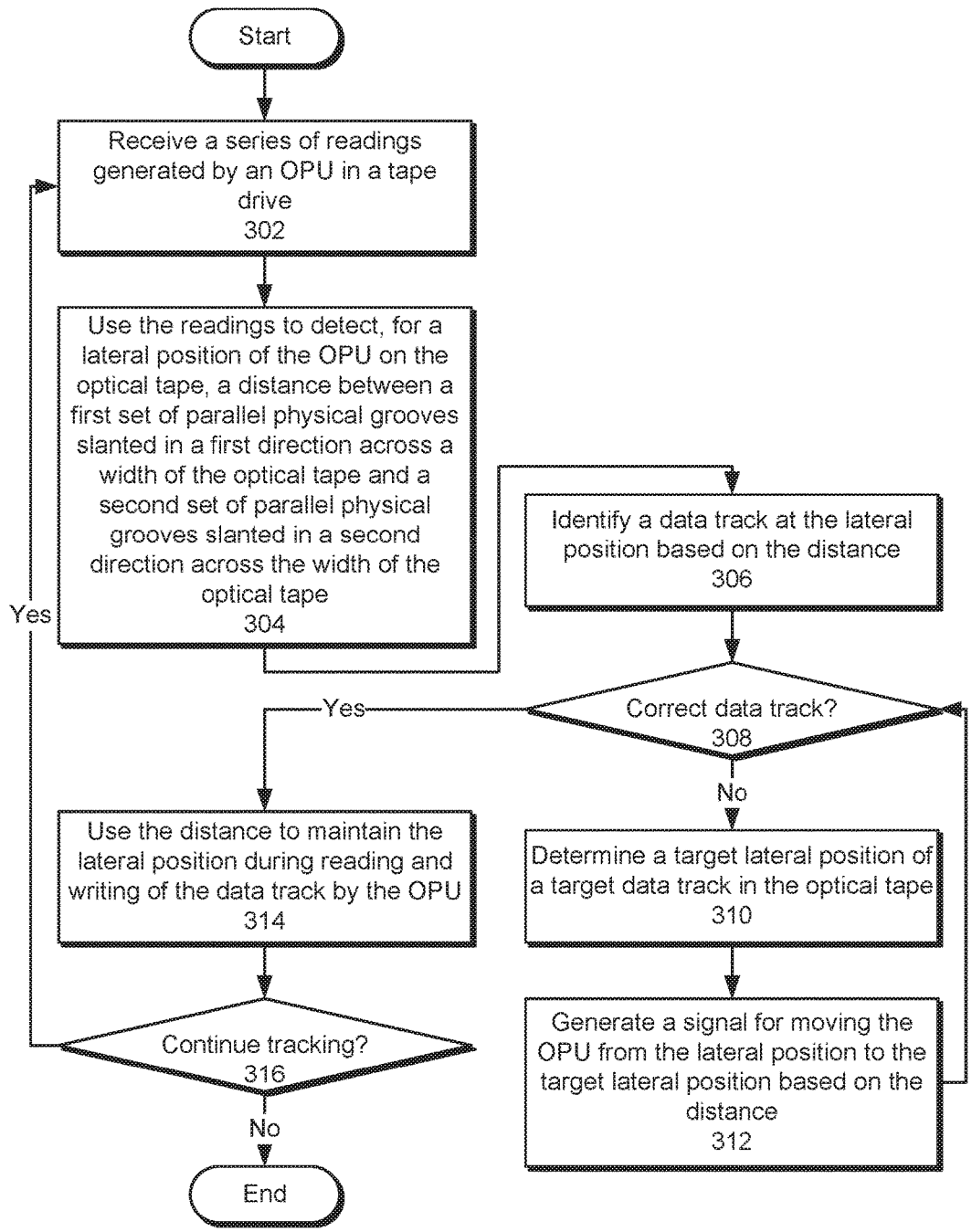
FIG. 3 illustrates a flowchart of operating a tape drive in accordance with one or more embodiments.

FIG. 3 illustrates a flowchart of performing tracking on an optical tape in accordance with one or more embodiments. In one or more embodiments, one or more of the steps may be omitted, repeated, and/or performed in a different order. Accordingly, the specific arrangement of steps shown in FIG. 3 should not be construed as limiting the scope of the embodiments.

First, a series of readings generated by an OPU in a tape drive is received (operation 302). The readings may be generated from alternating sets of parallel physical grooves formed in a substrate of the optical tape. For example, one set of physical grooves may slant in one direction (e.g., upward) in the optical tape, and another set of physical grooves may slant in another direction (e.g., downward) in the optical tape. Each set of physical grooves may have a predetermined number of equally spaced grooves (e.g., 4-5). In addition, the spacing between grooves in a given set may be selected to facilitate resolution and/or detection of the set by the OPU. For example, four parallel grooves in a given set may each have a width of 1 micron and be separated by 1 micron. To further facilitate detection of the physical grooves, the optical tape may include a reflective layer that is masked off in portions that overlap with the parallel physical grooves.

Next, the readings are used to detect, for a lateral position of the OPU on the optical tape, a distance between a first set of parallel physical grooves slanted in a first direction across a width of the optical tape and a second set of parallel physical grooves slanted in a second, different direction across the width of the optical tape (operation 304). A data track at the lateral position is also identified based on the distance (operation 306), as discussed in further detail below with respect to FIG. 4.

The data track at the lateral position may or may not be the correct data track (operation 308) for reading or writing by the OPU. If the data track is correct, the distance is used to maintain the lateral position during reading and writing of the data track by the OPU (operation 314). For example, a controller for the OPU may generate a control signal that maintains the distance calculated in operation 304 within a certain margin of error.

If the data track is incorrect, a target lateral position of a target data track in the optical tape is determined (operation 310), and a signal for moving the OPU from the lateral position to the target lateral position is generated based on the distance (operation 312). For example, the signal may be a control signal that minimizes the tracking error represented by the difference between the current lateral position of the OPU and the target lateral position.

Tracking may continue (operation 316) during reading and writing of the optical tape by the tape drive. During such tracking, readings of sets of parallel physical grooves may be generated by the OPU and used to periodically identify a distance between adjacent sets of parallel physical grooves that represents the lateral position of the OPU and a data track at the lateral position (operations 302-306). The distance may then be used to stay on the data track or move to a different data track (operations 308-314). Operations 302-316 may be repeated until reading or writing of the optical tape is no longer being performed.

6. Identifying a Data Track at a Lateral Position on an Optical Tape

Figure 4:
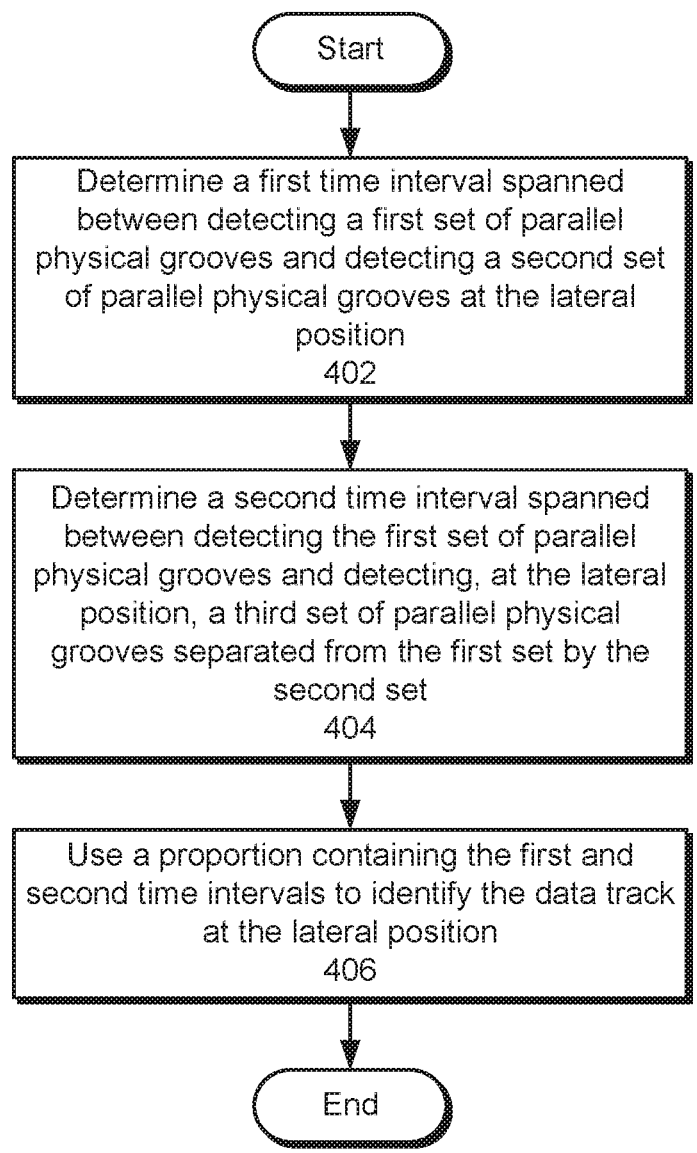
FIG. 4 illustrates a flowchart of identifying a data track at a lateral position on an optical tape in accordance with one or more embodiments.

FIG. 4 illustrates a flowchart of identifying a data track at a lateral position on an optical tape in accordance with one or more embodiments. In one or more embodiments, one or more of the steps may be omitted, repeated, and/or performed in a different order. Accordingly, the specific arrangement of steps shown in FIG. 4 should not be construed as limiting the scope of the embodiments.

Initially, a first time interval spanned between detecting a first set of parallel physical grooves and detecting a second set of parallel physical grooves at the lateral position is determined (operation 402). For example, the first and second sets of parallel physical grooves may be adjacent sets of parallel physical grooves imprinted in a servo pattern on the optical tape. Next, a second time interval spanned between detecting the first set of parallel physical grooves and detecting a third set of parallel physical grooves separated from the first set by the second set is determined (operation 404). For example, the first, second, and third sets of parallel physical grooves may be consecutive sets of physical grooves that form a servo frame in the optical tape.

Finally, a proportion containing the first and second time intervals is used to identify the data track at the lateral position (operation 406). For example, the first time interval may be divided by the second time interval to obtain a value that ranges between 0 and 1. The value may represent the lateral position as a proportional distance from between the two edges of the optical tape. The lateral position may then be mapped to the data track based on the number of data tracks in the optical tape and/or the separation between the data tracks.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, optical tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. An optical tape, comprising:
   a substrate layer comprising:
      a first set of parallel physical grooves slanted in a first direction across a width of the optical tape; and
      a second set of parallel physical grooves slanted in a second direction that is different from the first direction across the width of the optical tape;
   a rewritable recording layer; and
   a reflective layer that is masked off in portions that overlap with the first and second sets of parallel physical grooves.

2. The optical tape of claim 1, wherein subsets of the first set of parallel physical grooves alternate with subsets of the second set of parallel physical grooves along a length of the optical tape.

3. The optical tape of claim 2, wherein two subsets of the first set of parallel physical grooves separated by one subset of the second set of parallel physical grooves form a servo frame in the optical tape.

4. The optical tape of claim 3, wherein a fixed separation between the two subsets of the first set of parallel physical grooves is used to determine a speed of the optical tape.

5. The optical tape of claim 3, wherein a distance between a first point at a lateral position on one subset of the first set of parallel physical grooves and a second point at the lateral position on the one subset of the second set of parallel physical grooves is used to determine a data track at the lateral position.

6. The optical tape of claim 2, wherein each subset of the first and second sets of parallel physical grooves comprises a number of equally spaced parallel physical grooves.

7. The optical tape of claim 1, wherein each groove in the first and second sets of parallel physical grooves has a width of 1 micron.

8. The optical tape of claim 1, wherein the recording layer comprises a series of parallel data tracks, wherein adjacent data tracks in the series of parallel data tracks are not separated by the first and second sets of parallel physical grooves.

9. The optical tape of claim 8, wherein the series of parallel data tracks runs along a length of the optical tape.

10. The optical tape of claim 1, wherein the rewritable recording layer comprises a phase-change material that converts between a crystalline state and an amorphous state.

11. An optical tape, comprising:
    a substrate layer comprising:
       a first set of parallel physical grooves slanted in a first direction across a width of the optical tape; and
       a second set of parallel physical grooves slanted in a second direction that is different from the first direction across the width of the optical tape,
       wherein each subset of the first and second sets of parallel physical grooves comprises a number of equally spaced parallel physical grooves, and wherein the equally spaced parallel physical grooves are separated by a spacing that is equal to a width of each of the equally spaced parallel physical grooves; and a rewritable recording layer.

12. A tape drive, comprising:
an optical pick-up unit (OPU) comprising:
  a laser configured to read or write to an optical tape, wherein the optical tape comprises:
    a first set of parallel physical grooves slanted in a first direction across a width of the optical tape; and
    a second set of parallel physical grooves slanted in a second direction that is different from the first direction across the width of the optical tape; and
  an actuator for the laser; and
a controller for the OPU, wherein the controller is configured to:
  periodically detect, for a lateral position of the OPU on the optical tape, a distance between a first subset of parallel physical grooves in the first set of parallel physical grooves and a second subset of parallel physical grooves in the second set of parallel physical grooves by:
    determining a first time interval spanned between detecting the first and second subsets of parallel physical grooves at the lateral position;
    determining a second time interval spanned between detecting the first subset and detecting a third subset of parallel physical grooves in the first set of parallel physical grooves at the lateral position; and
    using a proportion comprising the first and second time intervals to identify the data track at the lateral position;
  identify a data track at the lateral position based on the distance; and
  use the distance to maintain the lateral position of the OPU during reading and writing of the data track by the laser.

13. The tape drive of claim 12, wherein the first and third subsets of parallel physical grooves are separated by the second subset of parallel physical grooves in the optical tape.

14. The tape drive of claim 12, wherein the first, second, and third subsets of parallel physical grooves form a servo frame in the optical tape.

15. The tape drive of claim 12, wherein the controller is further configured to:
  determine a target lateral position of a target data track in the optical tape; and
  generate a signal to the actuator for moving the OPU from the lateral position to the target lateral position based on the distance.

16. A tape drive, comprising:
an optical pick-up unit (OPU) comprising:
  a laser configured to read or write to an optical tape, wherein the optical tape comprises:
    a first set of parallel physical grooves slanted in a first direction across a width of the optical tape; and
    a second set of parallel physical grooves slanted in a second direction that is different from the first direction across the width of the optical tape,
    wherein each subset of the first and second sets of parallel physical grooves comprises a number of equally spaced parallel physical grooves, and
    wherein the equally spaced parallel physical grooves are separated by a spacing that is equal to a width of each of the equally spaced parallel physical grooves; and
  an actuator for the laser; and
a controller for the OPU, wherein the controller is configured to:
  periodically detect, for a lateral position of the OPU on the optical tape, a distance between a first subset of parallel physical grooves in the first set of parallel physical grooves and a second subset of parallel physical grooves in the second set of parallel physical grooves;
  identify a data track at the lateral position based on the distance; and
  use the distance to maintain the lateral position of the OPU during reading and writing of the data track by the laser.

17. A method, comprising:
receiving a series of readings generated by an optical pick-up unit (OPU) in a tape drive, wherein the series of readings is generated from:
  a first set of parallel physical grooves slanted in a first direction across a width of the optical tape; and
  a second set of parallel physical grooves slanted in a second direction that is different from the first direction across the width of the optical tape;
using the readings to periodically detect, for a lateral position on the optical tape, a distance between a first subset of parallel physical grooves in the first set of parallel physical grooves and a second subset of parallel physical grooves in the second set of parallel physical grooves by:
  determining a first time interval spanned between detecting the first and second subsets of parallel physical grooves at the lateral position;
  determining a second time interval spanned between detecting the first subset and detecting a third subset of parallel physical grooves in the first set of parallel physical grooves at the lateral position; and
  using a proportion comprising the first and second time intervals to identify the data track at the lateral position;
identifying a data track at the lateral position based on the distance; and
using the distance to maintain the lateral position during reading and writing of the data track by the OPU.

18. The method of claim 17, further comprising:
determining a target lateral position of a target data track in the optical tape; and
generating a signal to the actuator for moving the OPU from the lateral position to the target lateral position based on the distance.

* * * * *